No. 741,292. PATENTED OCT. 13, 1903.
R. W. BAILEY.
FINE ADJUSTMENT FOR PROTRACTORS.
APPLICATION FILED JAN. 14, 1903.
NO MODEL.
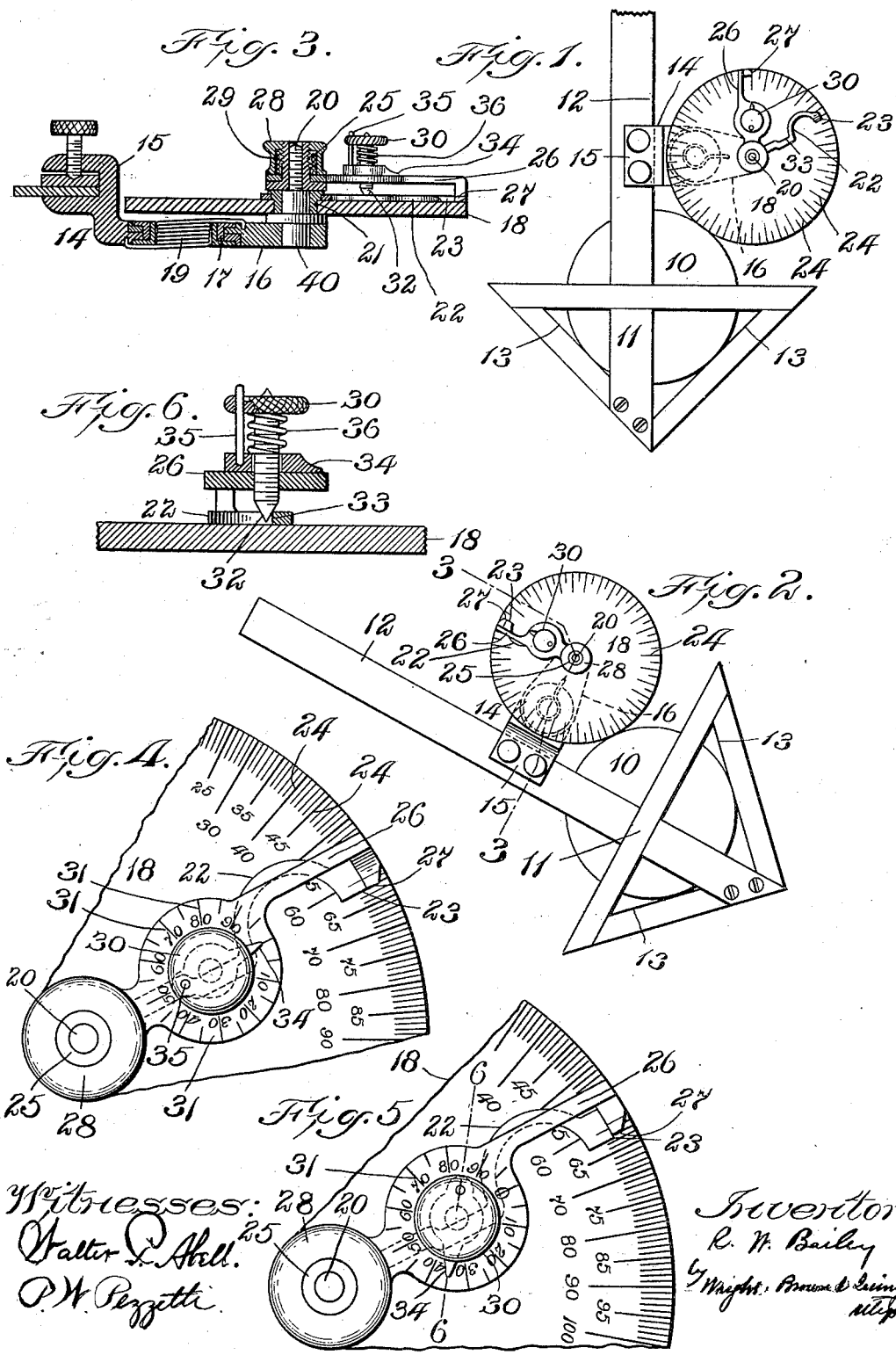
Witnesses:
Walter L. Abell.
P. W. Pezzetti.
Inventor,
R. W. Bailey
by Wright, Brown & Quinby
Attys.

No. 741,292. Patented October 13, 1903.

UNITED STATES PATENT OFFICE.

RALPH W. BAILEY, OF WEST NEWBURY, MASSACHUSETTS.

FINE ADJUSTMENT FOR PROTRACTORS.

SPECIFICATION forming part of Letters Patent No. 741,292, dated October 13, 1903.

Application filed January 14, 1903. Serial No. 138,975. (No model.)

*To all whom it may concern:*

Be it known that I, RALPH W. BAILEY, of West Newbury, in the county of Essex and State of Massachusetts, have invented certain new and useful Improvements in Fine Adjustments for Protractors, of which the following is a specification.

This invention relates to circular protractors, and particularly those of the character described in Letters Patent No. 679,934, granted to me August 6, 1901, designed as attachments for center-finding squares, whereby any number of equal angular divisions may be laid off on the face of a disk or cylinder.

The object of the present invention is to provide a slow-motion adjustment for the protractor whereby, supposing the latter, for instance, to be graduated in degrees, small fractions of these divisions, as minutes, may be read on or obtained with the instrument. In the protractor of my aforesaid patent, in connection with which I have hereinafter shown the present invention as embodied, there is employed a protractor disk or wheel adapted to be clamped to the center-finding square and to rotate on the periphery of the disk or cylinder whose surface is to be graduated. Above the surface of the protractor are two index-arms, one of which rotates frictionally with the protractor and is adapted to be set to different positions thereon and the other of which is adapted to be set in a fixed relation with the square. If the former arm, which may be called the "rotating" arm, is placed at a distance from the other arm, which may be termed the "fixed" arm, corresponding to an arc equal in length to the arc desired to be marked on the disk or cylinder and the square, with the protractor, be then rotated until the protractor rolling against the surface of the disk or cylinder carries its rotating arm into coincidence with the fixed arm the square will then have moved through the desired angle, which may be indicated on the disk or cylinder by marking the first and final positions of said square. Heretofore if it was desired to place the rotating arm at a point on the protractor between two divisions, so as to indicate a certain number of minutes of arc, it has been necessary to guess at or merely approximeat the subdivisional position of the arm. My present invention, however, provides a means for accurately locating the rotary arm to any subdivisional position, and this result I accomplish in the embodiment described by providing on the fixed arm a screw having a conical point adapted to bear against the edge of the rotating arm. A given amount of rotation of the screw corresponds to a known longitudinal movement and a predetermined angular displacement of the rotary arm. The screw carries a pointer registering with the divisions of a dial on the fixed arm, whereby the amount of rotation of the screw is determined. Then the two arms being brought into coincidence and the fixed arm clamped by rotating said screw, the rotary arm may be given the desired amount of displacement.

Of the accompanying drawings, Figure 1 represents a plan view of a protractor constructed in accordance with my invention and attached to a square, which is shown as applied to the work to be marked. Fig. 2 represents a similar view with the parts in their second position and the arms of the protractor in coincidence. Fig. 3 represents a section on line 3 3 of Fig. 2. Figs. 4 and 5 represent enlarged fragmental plan views showing relative positions of the protractor-arms before and after use of the fine adjustment. Fig. 6 represents a section on line 6 6 of Fig. 5.

The same reference characters indicate the same parts in all the figures.

In the drawings, 10 is the circular cylinder or disk whose face is to be graduated, and 11 is an ordinary center-finding square having a straight edge 12 and edges 13 13 at equal angles to said straight edge and at right angles to each other, so that when the edges 13 are applied to the periphery of the cylinder 10 the edge 12 passes through the center of the circle of said cylinder.

14 is a holder having a fixed or clamp part 15, adapted to be clamped to the blade of the square 11, and a swinging or movable part 16, pivoted by a hollow hinge-stud 17 to the fixed part 15. A graduated protractor disk or wheel 18 is rotatably mounted on the end of the swinging part 16, and a spring 19, contained in the tubular stud 17, normally moves the swinging part 16, so as to hold the periphery of protractor-wheel 18 against the periphery of the work 10 when the protractor-holder 14 is clamped in the proper position upon the blade of the square.

40 is a stud fixed in the swinging part 16 of the holder and having a threaded end 20, and 21 is a bushing fixed in the protractor-wheel 18 and rotatable on the journal part of stud 40.

22 is a rotating arm having an indicating edge 23, movable over the graduations 24 of the protractor-wheel 18, and a hub portion frictionally engaged with bushing 21. It is evident that as the protractor-wheel rotates the arm 22 rotates with it.

25 is a threaded-shank hollow flanged stud screwing on the end 20 and against the shoulder of stud 40 and whose flange supports an arm 26, which for convenience may be termed the "fixed" arm, as it may be fixed in relation to the holder 14. The term "fixed" in this connection merely expresses the fact that the arm 26 is normally—that is, when the protractor-wheel rotates the cylinder 10—stationary on its supporting part 16.

27 is the indicating edge of said arm, movable into and out of line with the edge 23 of arm 22.

28 is a cup-shaped nut screwing on the thread of stud 25 and containing a spring 29, which bears frictionally against the hub portion of arm 26. When said arm 26 is to be clamped rigidly to stud 40, the nut 28 is screwed down until its edges force the arm 26 hard against the flange of stud 25.

30 is a screw threaded into the arm 26 in the center of a circle of graduations 31 marked on the upper surface of said arm. The screw has a conical point or lower end 32, adapted to bear against the edge 33 of the arm 22 and having such a relation to the pitch of the thread of screw 30 that one complete rotation of said screw, the arm 26 being fixed, displaces the arm 22 a distance equal to one degree on the protractor-wheel 18. The graduations 31 on the arm 26 may be of any convenient minuteness—as, for instance, hundredths.

34 is a pointer-collar loosely surrounding the screw 32 and constrained to rotate therewith by means of a pin 35, fixed to the hub of said pointer and sliding in a hole in the head of screw 30. A spring 36, interposed between said screw-head and the pointer 34, presses the latter yieldingly against the surface of arm 26.

The method of operating the protractor is as follows: Assume, for illustration, that it is desired to make two marks on the face of cylinder 10 at a distance apart corresponding to an arc of sixty-two and thirty-five hundredths degrees on the protractor-wheel 18. The center-finding square 11, with the protractor attached, is placed against the cylinder 10, as shown in Fig. 1, and the first mark is made on the face of said cylinder against the straight edge 12. While the square is in this position and the protractor-wheel 18 stationary against the cylinder 10, the rotary arm 22 is moved out to the sixty-two-degree graduation on the protractor-wheel 18. The nut 28 being loosened, the fixed arm 26 is moved out to a position coincident with that of the arm 22 at the sixty-two-degree mark. The arrangement is such that when the screw 30 is screwed down into operative relation with the arm 22 the side of its conical point just contacts with the edge 33 on arm 22 when the pointer is at zero and the indicating edges 23 27 of the two arms in coincidence. The nut 28 is screwed down to clamp the arm 26 rigidly, and the screw 30 is rotated until its pointer registers with the thirty-five-hundredths graduation on arm 26. This displaces arm 22 laterally through thirty-five hundredths of a degree of arc on the protractor-wheel 18 and the arm 22 then stands at a distance of sixty-two and thirty-five hundredths degrees from the zero-mark on protractor-wheel 18. The arm 26 is now loosened and moved back to coincide with said zero-mark and again clamped to the stud of holder 14. Next the square 11 and the protractor are rotated around the cylinder 10 until the arms 22 26 come into coincidence, as indicated in Fig. 2, and the second mark made on the cylinder 10 against the straight edge 12 in this position will be at an angular distance from the first mark previously made corresponding to the arc of sixty-two and thirty-five hundredths degrees on the protractor-wheel.

I claim—

1. In a protractor, the combination of a supporting part, a protractor-wheel rotatable thereon, an adjustable index member rotating with said wheel, a second adjustable index member normally stationary on said supporting part, and an adjusting device connective of said index members for effecting a slow-motion relative adjustment thereof.

2. In a protractor, the combination of a supporting part, a protractor-wheel rotatable thereon, an adjustable index member rotating with said wheel, a second adjustable index member normally stationary on said supporting part, and a screw on the last-said index member having a conical portion coacting with the other index member for effecting a slow-motion adjustment of the first-said index member.

3. In a protractor, a graduated wheel, an index-arm, a second index-arm having a scale, a screw mounted in said second arm and having a conical end coacting with the first-said arm, and a pointer mounted to rotate with said screw and coacting with said scale.

4. In a protractor, a graduated wheel, an index-arm, a second index-arm having a scale, a pointer-collar loosely surrounding said screw, means preventing relative rotation of said screw and pointer-collar but permitting relative longitudinal movement thereof, and a spring interposed between said screw and pointer-collar for seating the latter against the arm.

In testimony whereof I have affixed my signature in presence of two witnesses.

RALPH W. BAILEY.

Witnesses:
R. M. PIERSON,
A. C. RATIGAN.